United States Patent Office 3,728,084
Patented Apr. 17, 1973

3,728,084
DEVICE FOR PREPARING COMBUSTIBLE SAMPLES CONTAINING COMPOUNDS LABELED WITH ³H AND ¹⁴C FOR MEASUREMENT OF THEIR RADIOACTIVITY
Wolfgang Hulsen, Spock, Germany, assignor to Gesellschaft fur Kernforschung m.b.H., Karlsruhe, Germany
Filed June 1, 1970, Ser. No. 42,464
Claims priority, application Germany, May 31, 1969, P 19 27 927.7; May 13, 1970, P 20 23 251.3
Int. Cl. G01n *31/12;* G01t *1/20;* G21h *5/00*
U.S. Cl. 23—253 PC    12 Claims

ABSTRACT OF THE DISCLOSURE

A device for the preparation of combustible samples containing compounds labeled with $^3$H and $^{14}$C for measuring their radioactivity in a liquid scintillation counter device. The device includes a transport device which advances any number of flasks into position with respect to a burette, a combustion chamber, and a sealing and numbering device. The flasks receive a charge of scintillator solution from the burette, an absorber solution containing combusted samples from an absorber which is connected by an appropriate valve to the combustion chamber, and a seal from the sealing and numbering device.
The combustion chamber includes a holder for carrying the samples, an electric ignition device and an injection device for flushing the combustion chamber after combustion.
To coordinately control the activity of the various parts of the device a control unit is provided.

---

The invention relates to a device for preparing combustible samples containing compounds labeled with $^3$H and $^{14}$C for measurement of their radioactivity in a liquid scintillation counting device having a sample changer for scintillation measurement flasks charged with scintillator solution.

The liquid scintillation technique is applied for measurement of the low energy beta radiation of tritium and carbon-14. The technique is based on the nuclear radiation energy from a sample to be measured being converted into light energy. The beta radiation from the sample interacts with a scintillator solution previously added to the sample to give rise to the radiation energy. The photons produced in the conversion are detected by a photomultiplier of a counter and registered by the latter. This requires only small quantities of the sample, with the technique of measurement being based on comparative measurements. However, since the state of aggregation of the substance under investigation and its chemical composition, concentration and color are, in most cases, not identical, the energy transfer yield is frequently changed, sometimes quite considerably. Therefore, accurate and reproducible measurements can be achieved only if a so-called quenching correction is made. The reduction of energy transfer is called quenching. The degree of quenching must be assessed for each sample and should be taken into account in calculating the activity contained in the sample. A quenching correction requires so-called external standards installed in the measuring equipment and an electronic computer system for calculation of the corrected results to be printed.

However, in many cases the quenching correction and the expensive electronic computer system become unnecessary, if each sample is burnt in pure oxygen before being added to the scintillator solution and the combustion products are picked up by an absorption solution. The absorbed combustion products no longer cause any quenching, but the solution as such does. If identical quantities and identical compositions of the absorption solutions are used in each case, the quenching level will remain constant and thus does not have to be taken into account in comparative measurements.

The devices described in the literature require expensive and time consuming methods of combustion. Thus, e.g., a sample is burnt on a platinum grid by means of a platinum ignition electrode in a vessel which has been evacuated in advance and then filled with pure oxygen to a pressure of 5 cm. below atmospheric. After combustion the vessel is cooled and a known volume of scintillator is injected into the vessel. For absorption of the carbon dioxide containing $^{14}$C, and for uniform distribution of the water containing $^3$H, respectively, the vessel is left standing for 15 minutes and shaken occasionally. Then a known volume of solution is withdrawn by means of a syringe and introduced into a scintillation measurement flask. Such a device is disclosed by H. E. Dobbs, in Int. Journal of Applied Radiation and Isotopes 17 (1966), 363–364. This means that only part of the solution gets into the counter for measurement. Besides, the combustion vessel must be discharged and cleaned after each preparation of a sample.

If the number of samples to be investigated increases so as to make it impossible to process them in such an arrangement (e.g., more than 17 samples a day), whole batteries of combustion devices must be set up, which require a relatively large amount of space. Or the combustion is carried out in a vessel which contains a strongly cooled absorber solution ready in a plug-shaped protuberance of the vessel during the combustion reaction in order to avoid the formation of an explosive gas mixture. After the short period of combustion of the substances held in a platinum grid under pure oxygen, and after some minutes of cooling to room temperature of the combustion products, the combustion vessel is agitated, e.g., by tilting or rotation, for some twenty or thirty minutes for absorption after removal of the plug. Such a device is disclosed by Kalberer and Rutschmann, in Helvetica Chim. Acta 44, Teil II, 1956–1966 1961).

In addition, there time required for filling the scintillation measurement flask with the scintillator solution and the absorption solution, for introducing fresh absorber solution for further combustion into the plug of the combustion vessel, and for adjusting the required cooling temperature in the absorber solution (e.g., to −60° C. with a mixture of Dry Ice and acetone) must also be considered. The flask is sealed and put on the transport device in the sample changer.

SUMMARY OF THE INVENTION

The present invention has as one of its objects to greatly reduce the number of combustion vessels of such arrangements combined in batteries and thus significantly decreasing the expenditure in terms of space and money.

Another object of the invention is to significantly reduce the time required per individual sample and thus increasing the processing capacity of a laboratory equipped with a liquid scintillation counter, thereby greatly simplifying the method of sample preparation for measurement and reducing the danger involved.

These and other objects are accomplished according to the present invention by the provision of a device for the preparation of combustible samples, containing compounds labeled with $^3$H and $^{14}$C for measuring their radioactivity in a liquid scintillation counter device. The sample preparing device includes a burette, a combustion chamber, a sealing and numbering device, a transport device and a control unit. The transport device advances any number of flasks into position for the following: to be charged with a scintillator solution from the burette; to receive an absorber solution containing the combusted samples from an absorption vessel; and to be sealed and numbered by the numbering device. The absorption vessel is connected to the combustion chamber by an appropriate valve through which the combusted samples are delivered to the absorption vessel in which the absorption solution is formed. The combustion chamber includes a holder for carrying the samples, an electric ignition device and an injection device for flushing the combustion chamber after combustion. The control unit coordinately controls the transport device, the burette, the combustion chamber including the absorption vessel, and the sealing and numbering device.

Hence, the present invention provides a device which permits the preparation of all the samples with the same degree of accuracy and independent of the qualification or skill of the operator.

DESCRIPTION OF THE PREFERRED EMBODIMENTS

Figure 1:
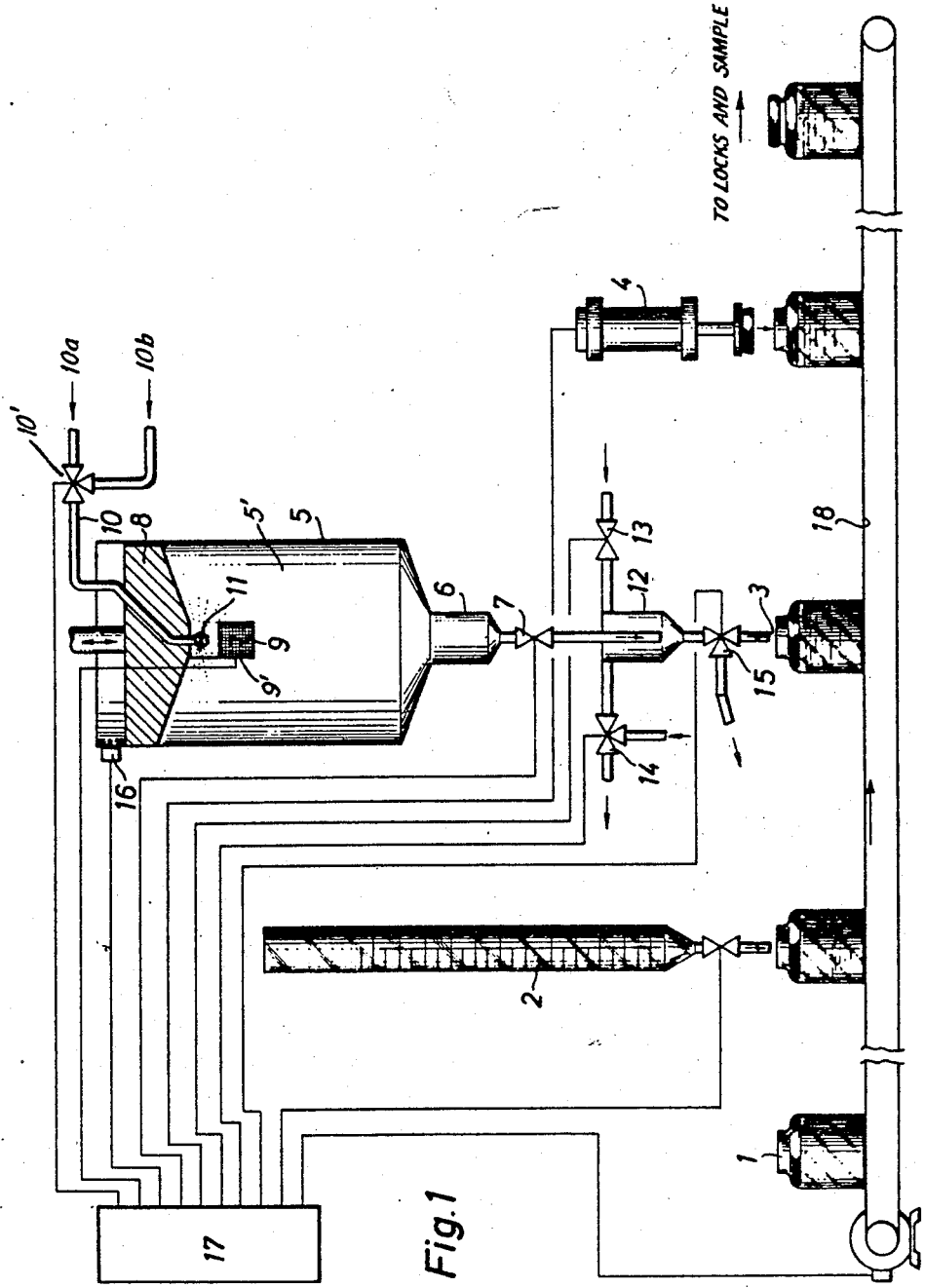
FIG. 1 schematically illustrates one embodiment of the device according to the present invention for the preparation of combustible samples in accordance with case A.

Referring more specifically to the drawings, a burette 2 is shown for charging the scintillation measurements flasks 1 with scintillator solution. A cylindrical combustion chamber 5, and an electromechanically actuated device 4 for sealing and numbering the flasks 1 are arranged above a transport system 18. The transport system 18 is designed so as to take the scintillation measurement flasks 1 stepwise individually and successively into positions for charging with scintillator solution and absorption solution, respectively, and for sealing the flasks and subsequently introduce them into the sample changer through locks.

Moreover, in the solution of the problem, the combustion chamber 5 is equipped with devices according to the invention for introducing the samples into the chamber, for complete transfer of the combustion products into an absorber solution, and for complete filling of the absorption solutions into the scintillation measurement flasks 1.

The device for introduction of the samples into the combustion chamber, in the case of single samples (case A, discussed hereinafter), is a gastight piston 8 which is movable within the chamber 5 and which can close the combustion chamber 5. At its upper end, the chamber 5 is equipped with a switching contact 16 so that when the piston 8 is introduced into the combustion chamber before combustion of a sample and when it is removed after combustion, the piston 8 always actuates the switching contact 16. The bottom side of the piston 8 holds a sample carrier designed like a basket 9 with an electric ignition device 9' and an injection device 10, 11 for flushing the combustion chamber 5 after combustion first with water and then with a flushing gas.

Figure 2:
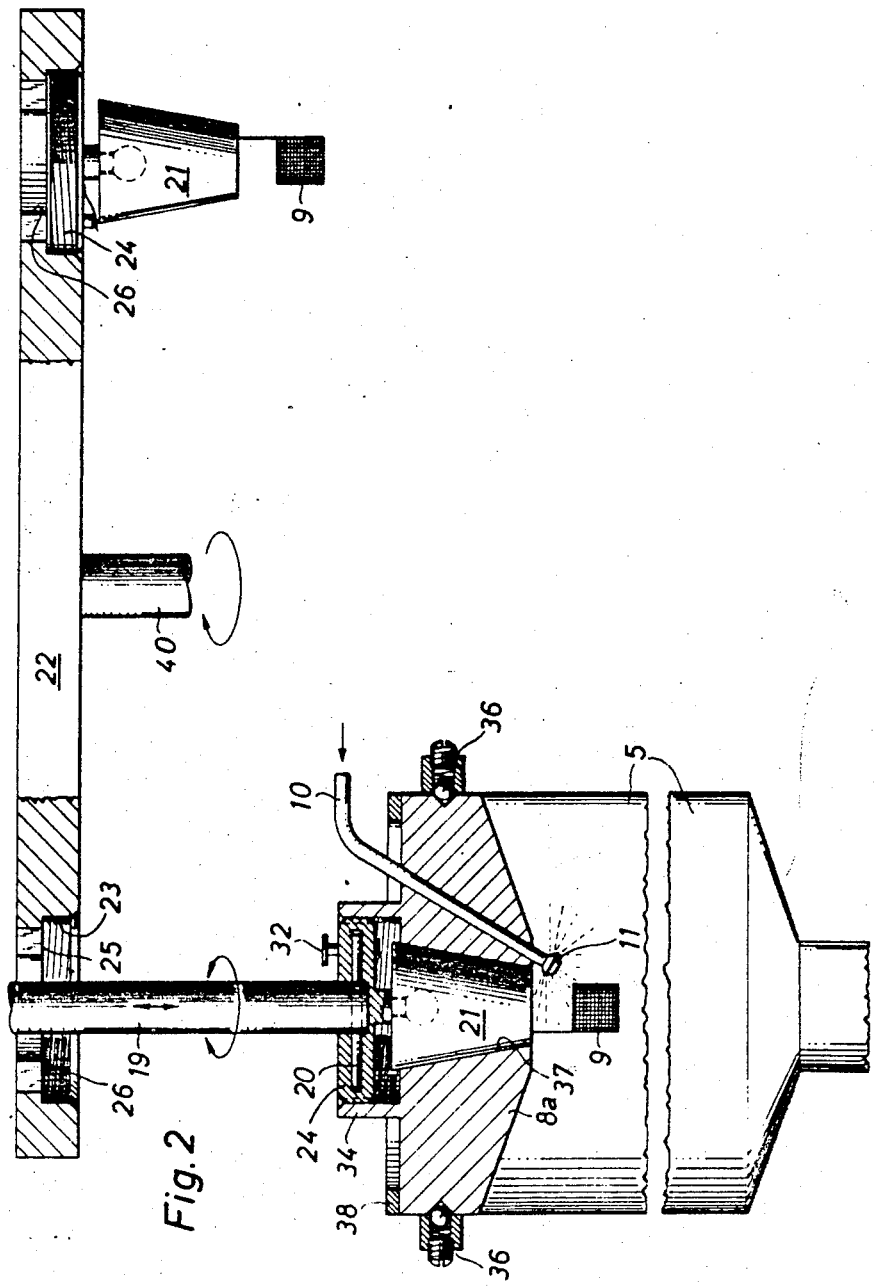
FIG. 2 schematically illustrates another embodiment of the device according to the present invention for the preparation of combustible samples in accordance with case B.

If a series of samples must be burnt, discussed hereinafter in (case B), introduction of the samples into the combustion chamber 5 is carried out by exchangeable center parts 21 of the piston 8a. (FIG. 2). The piston 8a holds only the sample carrier 9 with the ignition device 9', a loading device 22 holding these piston center parts 21 and supplying the combustion chamber 5 is also provided. The combustion chamber 5, which does not require the switching contact 16 in case B, in this case is equipped with a stop rim 38 at its upper end to retain the piston 8a.

The piston 8a has an opening 37 at its center into which the loading device 22 controlled and driven by a control unit lowers the center parts 21 of the piston 8a. The center parts 21 are lowered by means of a stem 19 singly and consecutively for tight closure of the piston 8a. The piston 18 is movable in the combustion chamber 5 and forms a gas tight fit therewith. The loading device 22 also removes the center parts 21 for replacement. The bottom side of the piston 8a carries an injection device 10, 11 for flushing the combustion chamber 5 after combustion, initially with water and then with a flushing gas.

A device for complete transfer of the combustion products into an absorber solution for case A and for case B includes the piston 8, which can be lowered into the chamber, and the piston 8a, which receives a center part 21 and can also be lowered into the chamber, respectively, with the injection device 10, 11, and the absorption vessel 12 included in each case. The absorption vessel 12 is rigidly connected with a cylindrical extension 6 of the bottom part of the chamber 5 through a remotely controllable one-way valve 7. The bottom side of the pistons 8 and 8a, respectively, are adapted to the conically tapered bottom of the combustion chamber 5 and the basket 9 is shaped and installed so as to fit into the tubular extension 6 in the lowest position of the pistons 8 and 8a, respectively. In its lowest position the bottom side of the pistons 8 and 8a, respectively, rest on the conical part of the combustion chamber 5.

The injection device 10, 11 consists of a feed pipe 10 and a nozzle 11. The feed pipe 10 is connected to a water feed line 10a and a nitrogen feed line 10b through a remotely controllable three-way valve 10'. The nozzle 11 is located at the end of the injection tube 10 and protrudes into the combustion space 5' from above the sample carrier 9. The three-way valve 10' is connected with the control unit 17 so as to admit first water as the flushing liquid and the nitrogen as the flushing gas after a combustion.

The absorption vessel 12 has another remotely controllable one-way valve 13 for feeding the absorber solution, a remotely controllable multi-way valve 14 for oxygen inlet or flushing gas outlet, and another remotely controllable multi-way valve 15 for alternative discharge of the absorption solution into the scintillation measurement flask 1 and discharge of the flushing solution, respectively. The absorber solution inlet valve 13 and the oxygen inlet valve 14 are located in the upper part of the absorption vessel, while the solution discharge valve 15 is located in the bottom part of that vessel.

As a device for complete filling of the absorption solutions into the scintillation measurement flasks 1 the absorption vessel 12 is provided with the remotely controllable valves 13, 14, 15 and the injection device 10, 11 for admitting nitrogen.

For case B, the loading device 22 is designed advantageously as a perforated disk arranged above and eccentrically with respect to the combustion chamber 5. The device 22 carries a plurality of piston center parts 21 in the hole-shaped recesses 23. The piston center parts 21 are stored prior to their introduction into the opening 37 provided for this purpose in piston 8a. The piston center parts 21 are conical and carry at their upper ends one pivoted, closing component 24. The component 24 is provided for the firm connection and release of the piston center parts 21 from the stem 19. For an airtight fitting in the piston 8a and easy release of the piston center parts 21 a head piece 34 attached to the top of the piston 8a is provided.

Figure 5:
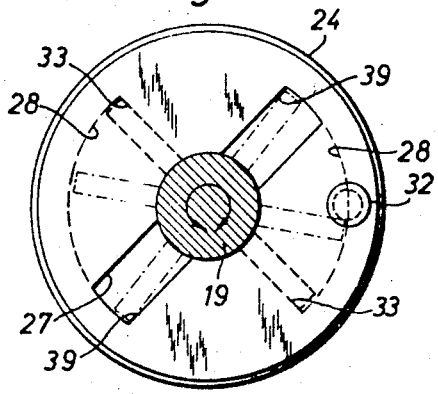
FIG. 5 is a view of the closing component illustrating details of the cavity and slot arrangement thereof.

The recesses 23 in the perforated disk 22, the closing components 24 and the headpiece 34 are each provided with screw threads. The combustion chamber 5 carries a locking device 36 at its upper end which holds the piston 8a in its initial position prior to combustion. The stem 19 is equipped with at least one follower pin 20 on its bottom end facing the closing component 24. The closing component 24 is designed as a plate with a cavity 28 (FIG. 5) accessible from the top through a slot 27, which functions as a bayonet lock. The component 24 accommodates the bottom part of the stem 19. The cavity 28 is provided with a lock 32 preventing rotation of the follower pin 20 around the longitudinal axis of the stem 19. The lock 32 consists of a bolt 31 held by a spring 30. The bolt 31 is struck by the follower pin 20 during rotation for removal of the piston center part 21 from the piston 8a and for re-insertion of the closing component 24 into the recess 23 of the perforated disk 22. This bolt 31 is provided with a transverse slot 29 releasing the follower pin 20 in its rotation in the position of the bolt 31 arising when the closing component 24 is screwed into the perforated disk 22 up to the stop 25.

The special advantages achieved with the invention are that the device according to the invention provides for the preparation of a number of samples which could otherwise only be handled only in part and by a battery arrangement of a multitude of combustion vessels. Accordingly the processing capacity of a laboratory equipped with a liquid scintillation counter is greatly increased. Up to now, the preparation of a single sample took about thirty minutes or more; the device according to the invention moves a sample into the sample changer within a few minutes, for example, not more than five minutes, after electric ignition. The electric ignition is carried out in the gastight sealed vessel and thus does not entail any losses of combustion products. In this way, it is possible to prepare and measure some 100 samples per working day. This saving in time is achieved by the design of the device according to the invention through a control unit 17 which actuates the remotely controllable valves and frequently carries out different individual functions simultaneously. The drawback in terms of time required by the previous methods of combustion was avoided frequently by applying a method of measurement without any combustion which, however, had to be carried out with costly electronic computer equipment because of the quenching correction required. The device according to the invention does not need this electronic system. Finally, when using the device according to the invention it is not necessary to cool the absorber solutions to —60° C. and to agitate or rotate the combustion vessels for absorption of the combustion products, which simplifies the method and the device.

The insertion of the sample and the few additional manipulations can be performed even by an unskilled operator who has only been trained on the job while, by contrast, all the devices known heretofore could be operated only by experienced, skilled operators or those who had been trained correspondingly.

The design of the device for case B practically limits the operator's expenditure in terms of work and time to inserting the samples to be burnt into the basket 9 and starting the device. The piston center parts 21 carrying the baskets 9 remain screwed in the perforated disk 22 during the sample insertion step by their closing components 24. If a perforated disk contains, e.g., 25 positions and 25 recesses 23, respectively, the device according to the invention, after insertion of the samples, does not require any maintenance, supervision etc. for a period of some 2 hours and five minutes, with five minutes per sample. This time is available to the operator for other work. Using a perforated disk with more than 25 positions correspondingly prolongs this time. Since the device can be started by making a contact, for instance on the control unit, there is the possibility of starting the device any time after insertion of the samples and of having the process of sample preparation performed also outside the usual working hours, when a time limit has been installed.

The invention can be applied wherever a large number of organic samples must be examined for $^3H$ and/or $^{14}C$ activity, e.g., blood, urine, bile, or other organs. One application to be mentioned just by way of example is the investigation of the metabolism on the basis of certain labeled compounds.

MODE OF OPERATION

Case A

An empty scintillation measurement flask 1 is put on the transport device 18 so that it can be moved below the remotely controled burette 2 when the unit is turned on. A sample to be burnt and containing $^3H$ and/or $^{14}C$ labeled compounds, some 100 to 150 mg., is put into the basket 9 of the piston 8. The basket 9 may be made of platinum mesh. During this period of time, the combustion chamber 5 made of, e.g., special steel is filled with oxygen. For the quantity of the sample mentioned above the wide tubular main section of the combustion vessel must have a height of only 120 mm. and an inner diameter of 80 mm. The narrower tubular extension 6 following at the lower end of this tube and provided with a one-way valve 7 and a discharge into the directly connected absorption vessel 12 must be only so large in length and diameter that the basket 9 fits well into the attachment 6 after the piston 8 has been lowered in the combustion space 5'. While the combustion chamber 5 fills with oxygen, the valves 7 and 14 are open in the direction of the oxygen inlet, while the valves 13 and 15 are closed. Insertion into the combustion chamber 5 of the piston 8 carrying the sample actuates the switching contact 16 which through the control unit 17, stops the oxygen flow, closes the one-way valve 7, switches the multi-way valve 14 in the direction of flushing, and ignites the sample electrically in the basket 6 (perhaps with a short delay of, e.g., one second).

About simultaneously with the ignition of the sample the control unit 17 opens the one-way valve 13, a specific quantity of absorber solution, e.g., 5 ml., is injected into the absorption vessel 12 (which may hold, e.g., 15 ml.), and the valve 13 is closed again. Also simultaneously with the ignition of the sample, the scintillation measurement flask 1 standing on the transport device 18, which is moved by the control unit 17, is moved below the remotely controlled burette 2 and filled with a specific quantity, e.g., 10 ml., of scintillator solution from the burette. Afterwards, the flask 1 is moved below the outlet opening 3 of the absorption vessel 12. The period of combustion is on the order of 10 seconds.

After a delay, determined by the short period of combustion (e.g., 1 minute or less), from the ignition of the sample, the spray nozzle 11 situated at the end of the spray tube 10 penetrating the piston 8 is actuated by the control unit 17 and initiates flushing of the combustion space 5' of the combustion chamber 5. A specific quantity of distilled water, e.g., 5 ml. is sprayed by the nozzle 11 during a water flushing step. Immediately upon the water flushing step the control unit 17 actuates a gradual downward motion of the gas-tight piston 8 in the combustion space 5'. At the same time the control unit 17 opens the one-way valve 7 and introduces a flushing gas, e.g., nitrogen, through the spray tube 10. In this way, the combustion products of the sample are introduced into the absorber solution together with the flushing water. Thereafter, the solution is called an absorption solution. A few seconds after the piston 8 has touched the bottom of the combustion chamber 5, the control unit 17 opens the multi-way valve 15 in the direction of the discharge of the absorption solution into the scintillation measurement flask 1 positioned below the outlet 3, closes the multi-way valve 14 and discharges the solution (e.g., 10 ml.). Thereafter the control unit 17 shuts down the gas flushing, closes the valve 7, opens the multi-way valve 15 in the direction of the outlet of the flushing solution and flushes the absorption vessel with a certain quantity of flushing liquid, e.g., 5 ml. of absorber solution, under pressure through the valve 13, which is also now open. After flushing, the valve 13 and 15 are closed again by the control unit 17.

Provided the valve 7 has closed, the control unit 17 starts the transport device 18 with the scintillation measurement flask 1, takes the flask 1 below the sealing mechanism 4, actuates the mechanism 4 so that the flask 1 is sealed and numbered and continues to move the transport device 18, so that the flask 1 moves through a lock and into a sample changer (not shown).

Also, after the valve 7 closes, the control unit 17 returns the piston 8 to its upper initial position which it occupied after insertion thereof into the combustion chamber 5, in such a way that the piston 8 is ready for removal from the combustion chamber 5 and thus for the introduction of another sample into the basket 9. If it is removed, it actuates the switching contact 16 in the reverse direction. This causes the control unit 17 to switch the multi-way valve 14 in the direction of oxygen inlet, to open the one-way valve 7 and to flush and fill, respectively, the combustion chamber 5 with oxygen until the piston 8 is inserted. Subject to the reverse actuation of the switching contact 16, the control unit 17 is set for the control of another process sequence of, e.g., a maximum of five minutes duration.

Case B

In the application of the device according to the invention for case B the process sequence is started by contact making at the control unit 17 shown in FIG. 1. The stem 19 is lowered by the loading device 22, which is controlled and driven by the control unit 17. The device 22 is lowered so that the follower pin 20 attached to its lower end is firmly engaged in, yet capable of being released from the piston center part 21. The piston center part 21 includes a closing component 24 which can be screwed into one of the hole-shaped recesses 23 of the perforated disk 22. The recesses 23 are provided in each case with a stop wall 25 for the component 24 and a slot-shaped opening 26 which only allows the stem 19 with its follower pin 20 to pass smoothly. The opening 26 is shown in a cross section in FIG. 2. The first lowering of the stem 19 is completed as soon as the stem passes through the opening 26 and slot 27 and reaches the cavity 28 of the plate-shaped closing component 24. In this position the stem 19 is caused by the drive (not shown) to move in a clockwise direction which causes the follower pin 20 to rotate against the stop 33 of the cavity 28. The pin 20 passes through the transverse slot 29 of the bolt 31 of the lock 32, which is still in the release position and held by a spring 30. Since the clockwise motion is maintained and accompanied by slight lowering, the follower pin 20 thus turns the closing component 24 out of the recess 23 of the perforated disk 22. During this removal, the spring 30 forces the bolt 31 into the locked position. The bolt remains in this position until the closing component 24 is again screwed into the perforated disk 22. As soon as the closing component 24 has been released from the perforated disk 22, it is lowered again with the stem 19 and screwed by further clockwise rotation into the headpiece 34 of the piston 8a. As a result the conically shaped piston center part 21, which is pivoted to the closing component 24, e.g., by means of a pivot joint 35, is inserted into the piston 8a and forms an airtight fit therewith.

Figure 3:
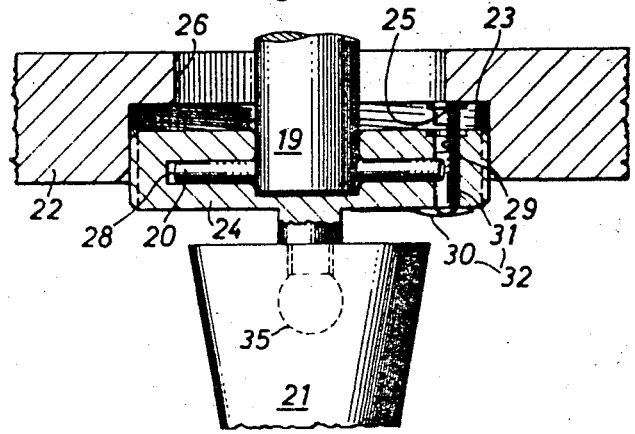
FIG. 3 is an elevational view partly in cross section of the perforated disk and closing component and sub-assembly utilized in the embodiment of FIG. 2.
Figure 4:
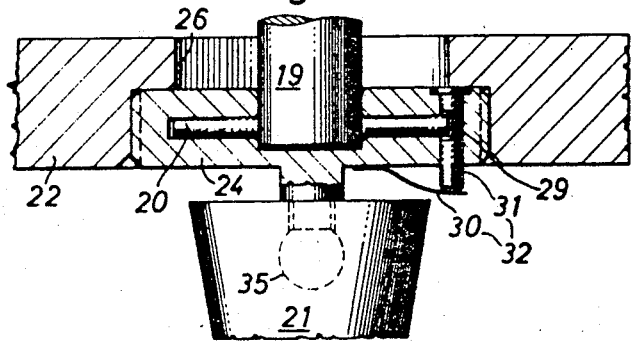
FIG. 4 is a view similar to FIG. 3 illustrating the closing component fully engaged with the perforated disk.

In this step, the piston 8a is retained in its position by the locking device 36. From the moment a contact has been made at the control unit 17, i.e., from the starting signal, up to the insertion of the piston center part 21 into the respective opening 37 of the piston 8a the combustion chamber 5, as described for case A, is flushed and filled with pure oxygen. When the combustion chamber 5 has been closed air tight in the way described above (FIG. 2), the introduction of oxygen is stopped and the process sequence of combustion of the sample, absorption of the combustion products, lowering the piston 8a into the combustion chamber 5, filling the absorption solution into the scintillation measurements flask 1 etc., and the subsequent upward motion of the piston 8a into its initial position is carried out as described in case A and controlled by the control unit 17 in accordance with a timing program. At the beginning of the lowering of the piston 8a said piston must be forced out of the locking device 36 holding it. When returned into its initial position, the piston 8a strikes the stop 38 of the combustion chamber 5 and is retained again in this position by the locking device 36. Subject to the striking the drive starts a counterclockwise rotation of the stem 19 which results first in the follower pin 20 striking the bolt 31 of the lock 32 and then causes the closing component 24 to turn out of the headpiece 34 of the piston 8a and thus a separation of the piston center part 21 from the piston 8a. At the same time, or slightly later, flushing and filling of the combustion chamber 5 with pure oxygen starts. As soon as the closing component 24 and the headpiece 34 are completely separated from each other, the drive raises the stem 19 until the closing component 24 has reached the recess 23 of the perforated disk 22. Further counterclockwise rotation of the stem 19 then screws the closing component 24 into the perforated disk 22 (FIG. 3). During this screwing-in step the bolt 31 strikes the stop 25 and is forced into the closing component 24 with increasing screwing distance of the closing component 24 until the transverse slot 29 releases the follower pin 20 in its rotation (FIG. 4).

The pin 20 then rotates in the cavity 28 until it engages the stop 39. The counterclockwise rotation is stopped and the stem 19 is raised above the perforated disk through the slot 27 of the closing component 24 and the slot-shaped opening 26 of the stop 25 of the perforated disk 22. The disk 22 then rotates around its axle 40 to get the next sample ready until the next piston center part 21 has been moved below the stem 19. Then the control unit actuates a lowering of the stem 19 and thus the beginning of the process sequence for preparation of another sample for the measurement of its radioactivity. A timing program provides for uniform execution of the individual process steps in the device and for shutdown of the device always after treatment of the last sample.

I claim:

1. A device for the preparation of combustible samples containing compounds labeled with $^3H$ and $^{14}C$ for measurement of their radioactivity in a liquid scintillation counter device having a sample changer for scintillation measurement flasks charged with scintillator solution, the device comprising:
   (a) a burette for charging the scintillation measurement flasks with scintillator solution;
   (b) a cylindrically shaped combustion chamber consisting of a temperature resistant material;
   (c) an absorption device, said absorption device including first means through which an absorber solution is delivered to said absorption device and second means through which the combustion products and absorber solution are delivered in solution into the flasks;
   (d) a remotely controllable one-way valve rigidly connecting said absorption device to said combustion chamber and through which the combustion products are transferred to said absorption device;
   (e) closable means operatively associated with said absorption device through which pure oxygen is delivered to said combustion chamber;
   (f) an electromechanically actuated device for sealing the flasks;
   (g) a transport device for individually and consecutively transporting the flasks into position for charging with scintillator solution, for charging with absorption solution, and for sealing, and for then introducing the flasks through locks and into the sample changer; and
   (h) an electromechanically actuated control unit controlling in a predetermined sequence the transport of the flasks, the charging of the flasks with scintillator solution, the ignition of the sample, the transfer of the combustion products into the absorber solution, the filling of the absorption solution into the flasks, and then sealing the flasks, wherein the burette, the combustion chamber, and the device for sealing and numbering are installed above the transport device, said combustion chamber comprising:

(i) an upper end;
(ii) a tapered bottom end;
(iii) a sample holding means including a movable gas tight piston which closes said upper end and a sample carrier formed as a basket connected to the bottom of said piston;
(iv) a sample ignition device carried by said basket;
(v) a switching contact which is provided at said upper end and which is engaged by said piston when said piston is introduced into the combustion chamber prior to the combustion of the sample and when said piston is removed from the combustion chamber after combustion; and
(vi) an injection device for flushing the combustion chamber after combustion, first with water and subsequently with a flushing gas.

2. The device as claimed in claim 1, wherein said first means of said absorption vessel comprises a remotely controllable one-way valve for feeding the absorber solution to said absorption vessel, said absorption vessel further including a remotely controllable multi-way valve for the admission of oxygen to said combustion chamber, thereby forming said closable means of said absorption vessel, and for the discharge of the flushing gas from said combustion chamber, and another remotely controllable multi-way valve for alternative discharge of the absorption solution into the scintillation measurement flask, thereby forming said second means of said absorption vessel, and discharge of the flushing solution, respectively, the inlet valve for feeding the absorber solution to said absorption vessel and the inlet valve for the admission of oxygen to said combustion chamber are installed in the upper part of said absorption vessel, while the outlet valve for discharging of the flushing solution is installed in the bottom part of said absorption vessel.

3. The device as claimed in claim 1, wherein the tapered bottom end of said combustion chamber is conical and converges into a narower cylindrical extension at the lower end of which said remotely controllable one-way valve is attached, and wherein the bottom side of said piston is adapted to the conically tapered bottom of said combustion chamber and said basket is shaped and installed in such a way as to fit into the cylindrical extension in the lower position of said piston, in which case the bottom side of said piston rests on the conical part of said combustion chamber.

4. The device as claimed in claim 1, wherein the injection device consists of a feed pipe connected at one end with a water feed line and a nitrogen feed line through a remotely controllable three-way valve and a spray nozzle attached to the other end of the feed line and protruding into the combustion space above the sample carrier, the three-way valve being connected with the control unit so as to admit after combustion first water as the flushing liquid and then nitrogen as the flushing gas.

5. A device for the preparation of combustible samples containing compounds labeled with $^3H$ and $^{14}C$ for measurement of their radioactivity in a liquid scintillation counter device having a sample changer for scintillation measurement flasks charged with scintillation solution, the device comprising:

(a) a burette for charging the scintillation measurement flasks with scintillation solution;
(b) a cylindrically shaped combustion chamber of a temperature resistant material;
(c) an absorption device, said absorption device including first means through which an absorber solution is delivered to said absorption device and second means through which the combustion products and absorber solution are delivered in solution into the flasks;
(d) a remotely controllable one-way valve rigidly connecting said absorption device to said combustion chamber and through which the combustion products are transferred to said absorption device;
(e) closable means operatively associated with said absorption device through which pure oxygen is delivered to said combustion chamber;
(f) an electromechanically actuated device for sealing the flasks;
(g) a transport device for individually and consecutively transporting the flasks into position for charging with scintillator solution, for charging with absorption solution, and for sealing, and for then introducing the flasks through locks and into the sample changer;
(h) an electromechanically actuated control unit controlling in a predetermined sequence transport of the flasks, the charging of the flasks with scintillator solution, the ignition of the sample, the transfer of the combustion products into the adsorber solution, the filling of the absorption solution into the flasks, and sealing and numbering of the flasks, wherein the burette, the combustion chamber, and the device for sealing and numbering are installed above the transport device, said combustion chamber comprising:

(i) an upper end which is provided with a stop rim;
(ii) a tapered bottom end;
(iii) a movable gas tight piston which partially closes said upper end; and
(iv) an injection device for flushing the combustion chamber after combustion first with water and subsequently with a flushing gas; and
(v) a loading device provided above the combustion chamber which supplies the samples to said chamber and is also connected to the control unit, said loading device includes a steam and supports a plurality of exchangeable piston center parts each with a sample carrier thereon, said carriers being designed as baskets with electric ignition devices, said loading device being controlled and driven by said control unit so that said piston center parts are engaged by said stem and individually and consecutively lowered for air tight engagement with said piston and, hence, with said combustion chamber, and thereafter removed for replacement.

6. The device as claimed in claim 5, wherein said loading device is formed as a perforated disk arranged eccentric to and above said combustion chamber and carrying a plurality of said piston center parts.

7. The device as claimed in claim 5, wherein said piston includes a headpiece attached to the upper side thereof for air tight fitting and easy release of said piston center parts.

8. The device as claimed in claim 5, wherein said combustion chamber is equipped with a locking device at its upper end and along its longitudinal side, said locking device holding said piston is an initial position before combustion.

9. The device as claimed in claim 5, wherein said loading device includes a plurality of hole-shaped recesses, said piston includes an opening therein for engaging said piston center parts, and wherein said piston center parts are supported in hole-shaped recesses before being introduced into said piston opening, said piston center parts being conically shaped and having a rotatable closing component at their upper ends for firm connection and reelase of said piston center parts with said stem.

10. The device as claimed in claim 9, wherein said recesses, said closing components and said headpiece on the upper side of the piston each are provided with screw threads.

11. The device as claimed in claim 5, wherein the bottom end of said stem facing said closing component is provided with at least one follower pin and wherein said closing component is formed as a plate with a cavity and a slot therein, said cavity being accessible from the top through said slot, said closing component forming a bayonet lock for accommodation of the bottom part of said stem, said closing component carrying a lock stopping the rotation of said follower pin around the longitudinal axis of said stem.

12. The device as claimed in claim 11, wherein said rotation lock consists of a bolt and a spring for supporting said bolt, said bolt is supported to be struck by said follower pin during the rotation thereof for removal of said piston center part from said piston and for reinsertion of said closing component into a respective recess, said bolt being provided with a transverse slot, said slot being positioned with respect to said pin when the closing component is fully screwed into its respective recess so that said pin is released to rotate past said bolt.

References Cited

UNITED STATES PATENTS

| | | | |
|---|---|---|---|
| 3,058,813 | 10/1962 | Barney II, et al. | 23—253 PC |
| 3,179,499 | 4/1965 | Hampton | 23—253 PC |
| 3,525,591 | 8/1970 | Jungner et al. | 23—253 R |

MORRIS O. WOLK, Primary Examiner

R. M. REESE, Assistant Examiner

U.S. Cl. X.R.

250—71.5 R, 106 SC